(12) United States Patent
Dobschal et al.

(10) Patent No.: US 10,481,397 B2
(45) Date of Patent: Nov. 19, 2019

(54) SPECTACLE LENS AND DISPLAY DEVICE WITH SUCH A SPECTACLE LENS

(71) Applicant: Carl Zeiss Smart Optics GmbH, Aalen (DE)

(72) Inventors: Hans-Juergen Dobschal, Kleinromstedt (DE); Karsten Lindig, Erfurt (DE)

(73) Assignee: tooz technologies GmbH, Aalen (DE)

( * ) Notice: Subject to any disclaimer, the term of this patent is extended or adjusted under 35 U.S.C. 154(b) by 0 days.

(21) Appl. No.: 14/907,534

(22) PCT Filed: Jul. 25, 2014

(86) PCT No.: PCT/EP2014/066113
§ 371 (c)(1),
(2) Date: Jan. 25, 2016

(87) PCT Pub. No.: WO2015/011288
PCT Pub. Date: Jan. 29, 2015

(65) Prior Publication Data
US 2016/0178908 A1 Jun. 23, 2016

(30) Foreign Application Priority Data
Jul. 26, 2013 (DE) .......................... 10 2013 214 700

(51) Int. Cl.
*G02B 27/01* (2006.01)
*G02C 7/08* (2006.01)
*G02B 27/30* (2006.01)

(52) U.S. Cl.
CPC ....... *G02B 27/0172* (2013.01); *G02B 27/017* (2013.01); *G02B 27/30* (2013.01);
(Continued)

(58) Field of Classification Search
CPC .. G02B 27/0172; G02B 27/017; G02B 27/30; G02B 27/0176; G02B 2027/011;
(Continued)

(56) References Cited

U.S. PATENT DOCUMENTS 5,348,477 A 9/1994 Welch et al.
6,091,546 A 7/2000 Spitzer
(Continued)

FOREIGN PATENT DOCUMENTS

DE 102009045128 A1 3/2011
DE 102011007811 A1 10/2012
(Continued)

OTHER PUBLICATIONS

International Preliminary Report on Patentability for application No. PCT/EP2014/066113 rendered by International Bureau of WIPO dated Jan. 26, 2016, 22 pages (including English translation of Written Opinion).
(Continued)

*Primary Examiner* — Evan P Dzierzynski
*Assistant Examiner* — Mitchell T Oestreich
(74) *Attorney, Agent, or Firm* — Skaar Ulbrich Macari, P.A.

(57) ABSTRACT

A spectacle lens is provided for an image-generating display device that can be fitted on the head of a user, wherein, in order to reduce vignetting occurring when guiding the generated image, which is coupled into the spectacle lens via the coupling-in section and guided through the spectacle lens by means of reflections as far as a coupling-out section, the curvature profile of the front and/or rear side in the edge area differs from the corresponding predetermined curvature profile of the front and/or rear side in the edge area such that there is a greater thickness of the spectacle lens in the edge
(Continued)

area in comparison with the thickness in the edge area that would result due to the predetermined curvature profile.

19 Claims, 3 Drawing Sheets

(52) U.S. Cl.
CPC .......... *G02C 7/086* (2013.01); *G02B 27/0176* (2013.01); *G02B 2027/011* (2013.01); *G02B 2027/0118* (2013.01); *G02B 2027/0125* (2013.01); *G02B 2027/0178* (2013.01)

(58) Field of Classification Search
CPC .... G02B 2027/0118; G02B 2027/0125; G02B 2027/0178; G02C 7/086
USPC ........................................................ 359/631
See application file for complete search history.

(56) References Cited

U.S. PATENT DOCUMENTS

| | | | |
|---|---|---|---|
| 6,157,353 A | 12/2000 | Song et al. | |
| 6,204,974 B1* | 3/2001 | Spitzer ................. | G02B 27/017 359/630 |
| 7,719,769 B2 | 5/2010 | Sugihara et al. | |
| 2006/0126181 A1 | 6/2006 | Levola et al. | |
| 2010/0220295 A1 | 9/2010 | Mukawa et al. | |
| 2011/0175799 A1 | 7/2011 | Yamada et al. | |
| 2012/0002294 A1 | 1/2012 | Dobschal et al. | |
| 2012/0062445 A1* | 3/2012 | Haddick .............. | G02B 27/017 345/8 |
| 2012/0162549 A1* | 6/2012 | Gao ................... | G02B 27/0172 349/11 |
| 2015/0036223 A1 | 2/2015 | Dobschal et al. | |

FOREIGN PATENT DOCUMENTS

| | | |
|---|---|---|
| DE | 102011007812 A1 | 10/2012 |
| EP | 2418073 A1 | 2/2012 |
| WO | 9813721 A1 | 4/1998 |
| WO | 2008089992 A1 | 7/2008 |
| WO | 2008090000 A1 | 7/2008 |

OTHER PUBLICATIONS

The concise explanation of the relevance of the WO 2008/090000 reference is provided in its drawings and in the English language abstract within the document.
The concise explanation of the relevance of the DE 102009045128 reference is provided in the attached English language abstract and description.
The concise explanation of the relevance of the WO 2008/089992 reference is provided in its drawings and in the English language abstract within the document.
The concise explanation of the relevance of the DE 102011007812 reference is provided in the attached English language abstract and description.
The concise explanation of the relevance of the International Preliminary Report on Patentability is provided in the attached English language translation of the Written Opinion.

* cited by examiner

SPECTACLE LENS AND DISPLAY DEVICE WITH SUCH A SPECTACLE LENS

PRIORITY

This application claims the benefit of German Patent Application No. 102013214700.7, filed on Jul. 26, 2013, which is hereby incorporated herein by reference in its entirety.

FIELD

The present invention relates to spectacle lenses for an image-generating display device, and more particularly, to spectacle lenses that can be fitted on the head of a user with a curved front side and a curved rear side, and, when the spectacle lens is viewed from above, with a coupling-in section in an edge area of the spectacle lens and a coupling-out section spaced apart therefrom, wherein the spectacle lens is suitable for coupling the generated image into the spectacle lens via the coupling-in section of the spectacle lens, for guiding it in the spectacle lens by reflection as far as the coupling-out section and for coupling it out of the spectacle lens via the coupling-out section, and wherein the spectacle lens provides a predetermined optical imaging function which is predefined by a predetermined curvature profile of the front side and a predetermined curvature profile of the rear side, and a display device with such a spectacle lens.

BACKGROUND

With such spectacle lenses and display devices the difficulty arises that the image guided in the spectacle lens by reflection (e.g. total reflection) or the corresponding light wave is influenced e.g. by the curved surface radii, with the result that after each reflection there is a different state of the propagating wave. In particular in the case of guiding by means of total reflection, due to the oblique incidence on the curved surfaces (front and rear sides) which is necessary for the total reflection, errors such as astigmatism and coma occur. It makes no difference whether or not the light was collimated before entering the spectacle lens.

In addition, the fundamental difficulty arises that the diameter of the light bundle guided through the spectacle lens increases, viewed in the direction from the coupling-out section towards the coupling-in section, with the result that only a limited étendue can be guided shading free through the spectacle lens and thus undesired vignetting can occur.

In order to avoid this vignetting, the coupling-out section could be formed with a relatively strong positive refractive power, wherein the thereby altered total focal length, which is predetermined by an image-generating module of the display device, is then to be corrected by means of an adaptation of the refractive power of the coupling-in section. However this leads to very strained optical conditions. In particular, focussed bundles are guided by the curved spectacle surfaces several times during the total reflection at very large angles of incidence due to the shorter focal length of the coupling-out section, whereby image errors such as astigmatism and coma are generated and the overall imaging performance suffers greatly.

SUMMARY

An object of the invention includes improving a spectacle lens such that, when used in an image-generating display device that can be fitted on the head of a user, imaging that is as shading free as possible is achieved with it, in order to make a large exit pupil and a large field of view possible.

The disclosure includes a spectacle lens wherein the curvature profile of the front and/or rear side in the edge area differs from the corresponding predetermined curvature profile of the front and/or rear side in the edge area such that there is a greater thickness of the spectacle lens in the edge area in comparison with the thickness in the edge area that would result due to the predetermined curvature profile.

Use is thus made of the fact that the edge area "thickened" in a targeted manner is an area in which the light of the generated image has a large bundle diameter, with the result that shadowing is avoided, and that this area lies outside the area through which, when the display device is fitted on, the user looks through the spectacle lens, with the result that there is no intrusion into the visual field of the user of the display device, which is regarded by the user as disadvantageous as, because of the thickening of the edge area, this no longer provides the predetermined optical imaging function.

This formation according to certain embodiments of the curvature profile in the edge area thus makes it possible to clearly reduce the vignetting and further ensures that the angles of incidence in the case of total reflection do not become too great, whereby astigmatism and coma can be avoided or reduced.

In particular the coupling-in and/or coupling-out section can have an imaging effect. Thus e.g. the coupling-in section can have a collimation effect.

The coupling-in and/or coupling-out section preferably carries out a folding of the beam path.

In the spectacle lens according to certain embodiments only the curvature profile of the rear side in the edge area can differ from the corresponding predetermined curvature profile of the rear side in the edge area. This has the advantageous result that the thicker edge area is scarcely perceptible from outside.

The differing curvature profile is in particular designed such that an imaging error of the spectacle lens, which occurs when the generated image is guided from the coupling-in to the coupling-out section through the spectacle lens, is corrected. Thus e.g. astigmatism and/or coma can be corrected.

The differing curvature profile can correspond to a non-spherical surface. In particular it can correspond to a freeform surface which is not spherical and has no rotational symmetry. In addition, it is possible for the freeform surface additionally also to have no mirror symmetry.

The edge area begins e.g. from a direction of view greater than 20°, 30° or 40° (in particular in relation to the direction when looking straight ahead).

The coupling-in section can also comprise an area of an end face of the spectacle lens connecting the front and rear sides. In particular this area of the end face can have an imaging effect.

The coupling-in section can be formed refractive and/or reflective.

In the spectacle lens according to certain embodiments, the difference of the curvature profile of the front and/or rear side from the predetermined curvature profile can be present only in the edge area.

The differing curvature profile can be formed only on the front side, only on the rear side or also on front and rear sides.

The edge area can extend as far as an end face which connects the front and rear sides. In particular the edge area is arranged at the edge of the spectacle lens and/or does not extend, when the spectacle lens is viewed from above, along the entire circumference of the spectacle lens. The extension in the circumferential direction can e.g. be smaller than 45°, 30° or 15°. However, it is also possible for the edge area, when the spectacle lens is viewed from above, to extend along the entire circumference of the spectacle lens or to be annular.

The predetermined curvature profile of front and rear sides can e.g. be spherical in each case. The spherical curvature profiles can be concentric, with the result that the predetermined optical imaging function is an imaging with a refractive power of zero. Naturally the predetermined optical imaging function can have a refractive power not equal to zero and e.g. serve to correct defective vision.

The coupling-out section can be arranged in a central area of the spectacle lens.

The generated image can be guided in the spectacle lens by reflection or reflections on the front and/or the rear side. For this purpose a reflective coating or a partially reflective coating can be provided on the corresponding sections of the front and rear sides. Alternatively it is possible for the reflection on front and/or rear side in each case to be a total internal reflection. In this case no reflective or partially reflective coating on the front or rear side is necessary.

It is also possible for at least one reflective layer to be formed in the spectacle lens, with the result that the guiding takes place by reflection on the front or rear side on the one hand and on the reflection layer on the other hand. In this case also, the reflection can take place on the front or rear side by total internal reflection or by reflection owing to a reflective or partially reflective coating. Furthermore, two reflective layers can also be formed spaced apart from each other in the spectacle lens, wherein the guiding in the spectacle lens (at least over a certain section) takes place by reflections on both layers. Naturally the described types of guiding of the image in the spectacle lens can also be combined with each other.

The spectacle lens according to certain embodiments can thus in particular be formed such that an image coupled into the spectacle lens via the coupling-in section is guided in the spectacle lens by reflections as far as the coupling-out section and coupled out of the spectacle lens via the coupling-out section.

Furthermore, a display device is provided, with a holder that can be fitted on the head of a user, an image-generating module which generates an image and is secured to the holder, and an imaging optical system which is secured to the holder and which has a spectacle lens according to certain embodiments (including developments according to certain embodiments) and images the generated image, when the holder is fitted on the head, such that the user can perceive it as a virtual image.

The display device according to certain embodiments thus comprises a holder that can be fitted on the head of a user, an image-generating module secured to the holder, which generates an image, and an imaging optical system secured to the holder, which has a spectacle lens with a curved front side and a curved rear side and images the generated image, when the holder is fitted on the head, such that the user can perceive it as a virtual image, wherein the image generated by the image-generating module is coupled into the spectacle lens via a coupling-in section of the spectacle lens, guided in the spectacle lens by reflection (e.g. total internal reflection) as far as a coupling-out section and coupled out of the spectacle lens via the coupling-out section, wherein, when the spectacle lens is viewed from above, the coupling-in section is formed in an edge area of the spectacle lens and the coupling-out section is spaced apart from it (e.g. in a central area of the spectacle lens), wherein the spectacle lens provides a predetermined optical imaging function for the user when viewing the surroundings through the spectacle lens, which function is predefined by a predetermined curvature profile of the front side and a predetermined curvature profile of the rear side, wherein, in order to reduce vignetting occurring in the case of imaging by means of the imaging optical system, the curvature profile of the front and/or rear side in the edge area differs from the corresponding predetermined curvature profile of the front and/or rear side in the edge area such that there is a greater thickness of the spectacle lens in the edge area in comparison with the thickness in the edge area that would result due to the predetermined curvature profile.

The imaging optical system can have the spectacle lens as a single optical element. However, it is also possible for the imaging optical system to comprise a further optical element or several further optical elements in addition to the spectacle lens.

Furthermore, it is possible to arrange collimation optics between the spectacle lens and the image-generating module, which can also be called an imaging system module, with the result that the light from the imaging system module is coupled into the spectacle lens as a collimated bundle. The collimation optics can be part of the imaging optical system.

The image-generating module can in particular have a flat imaging system, such as e.g. an LCD module, an LCoS module or an OLED module. The imaging system can be self-luminous or not self-luminous.

The image-generating module can in particular be formed such that it generates a monochromatic or a multi-coloured image.

The display device according to certain embodiments and/or the spectacle lens according to certain embodiments are/is in particular formed such that the light beams contributing to the generation of the virtual image all experience the same number of reflections between deflecting section and coupling-out section.

The display device according to certain embodiments can have further elements known to a person skilled in the art, which are necessary for its operation.

It is understood that the features mentioned above and those yet to be explained below can be used not only in the stated combinations but also in other combinations or alone, without departing from the scope of the present invention.

Figure 1:
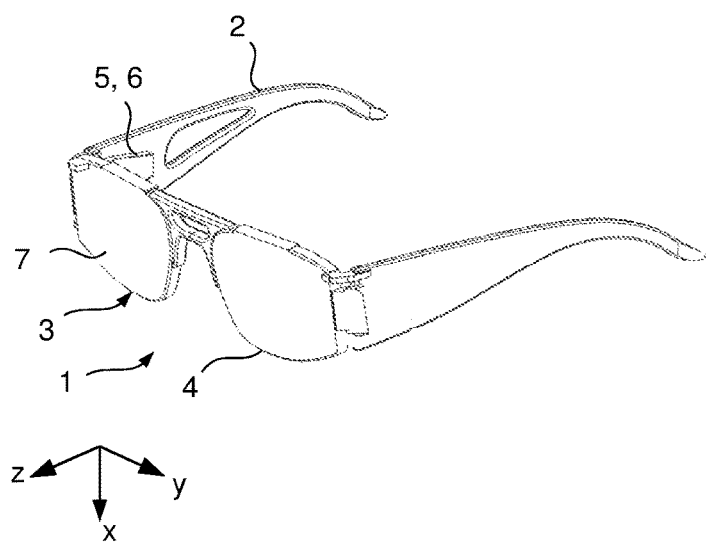
FIG. 1 is a schematic perspective representation of an embodiment of the display device according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 comprises a holder 2 which can be fitted on the head of a user and which can be formed e.g. in the manner of a conventional spectacles frame, as well as a first and a second spectacle lens 3, 4 which are secured to the holder 2. The holder 2 with the spectacle lenses 3 and 4 can be formed e.g. as sports glasses or sunglasses, wherein a virtual image can be reflected into the user's field of view via the first spectacle lens 3, as described below. The spectacle lenses 3, 4 are formed such that they have no optical imaging effect, and thus no correction of defective vision takes place.

The spectacle lenses 3, 4, and in particular the right-hand spectacle lens 3, are only described by way of example together with the display device 1. The spectacle lenses 3, 4, or at least the right-hand spectacle lens 3, are in each case formed separately as a spectacle lens 3, 4.

As can best be seen from the enlarged detailed sectional view of the first (right-hand) spectacle lens 3 (the holder 2 is not represented), the display device 1 comprises an image-generating module 5 and a control unit 6. Both the image-generating module 5 and the control unit 6 are represented purely schematically and are preferably secured to the holder 2.

Figure 3A:
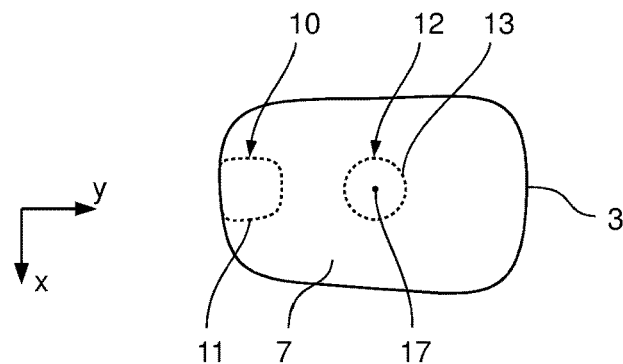
FIG. 3a is a top view from the front of the spectacle lens from FIG. 1.

The right-hand spectacle lens 3 has a spherically curved front side 7, a curved rear side 8 and an end face 9. On the front side 7, as can be seen in particular from FIG. 3a, a deflecting section 11 is formed in an edge area 10 and a coupling-out section 13 is formed in a central area 12. The central area 12 and thus the coupling-out area 13 preferably lie such that the visual axis of the user wearing the display device 1, when looking straight ahead, passes through the central area 12 and thus also through the coupling-out section 13. The corresponding penetration point is labelled with the reference number 17. The deflecting section 11 can for example be formed reflective in such a manner that the light beams coming from the image-generating module 5, which strike the deflecting section 11 via the end face 9, are deflected such that they are then guided on the rear side 8 and front side 7 by total internal reflection as far as the coupling-out section 13. The deflecting section 11, together with the end face 9, thus forms a coupling-in section 15.

The coupling-out section 13 is formed such that it deflects the light beams in the direction towards an exit pupil 14, against which a user has the pupil of his eye when the display device is fitted on. The end face 9, the deflecting section 11 and/or the coupling-out section 13 have an imaging property which is selected such that the image generated by means of the image-generating module 5 is presented to the user as a virtual image in the exit pupil 14.

The coupling-out section 13 is preferably formed such that a user wearing the display device 1 can perceive the imaged image superimposed with the surroundings. Thus the coupling-out section 13 can be formed e.g. as a partially transparent Fresnel structure. In particular the coupling-out section 13 can be realized as a Fresnel structure in the manner described in WO 2010/097442 A1 and WO 2010/097439 A1, wherein the corresponding description together with the figures of these published documents is hereby included in the present disclosure.

Figure 2:
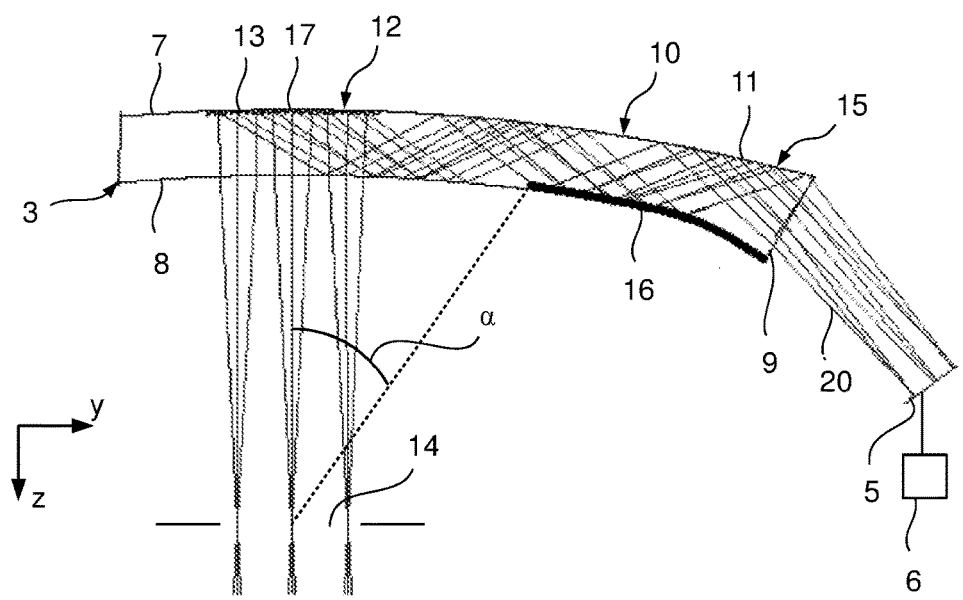
FIG. 2 is a detailed sectional view of the right-hand spectacle lens of the display device from FIG. 1.

The embodiment shown in FIG. 2 is characterized by a large exit pupil or eyebox 14 (the area which is provided by the display device 1 and in which the user's eye can move and he can still always perceive the coupled-out image) and a large field of view.

Figure 4:
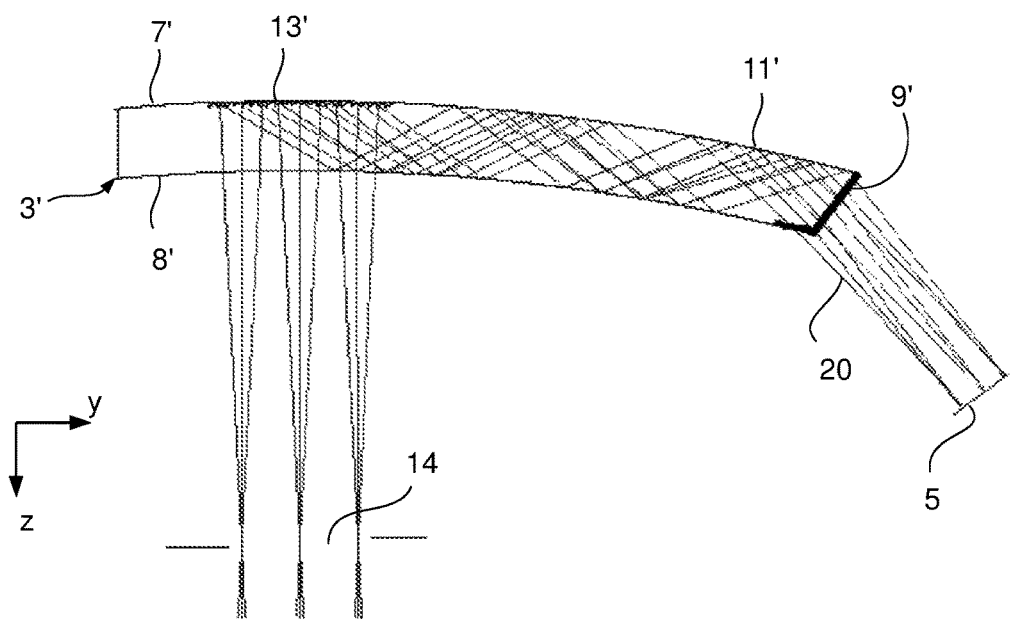
FIG. 4 is a sectional view according to FIG. 2 of a conventional spectacle lens.

This is advantageously achieved in that the edge area 10, in which the coupling-in section 15 is formed, has a greater thickness in comparison with a conventional design, which is schematically represented in FIG. 4 (the reference numbers of the corresponding elements in comparison with the formation are in each case indicated with an apostrophe).

In the case of a conventional design e.g. the front side 7' and rear side 8' of the spectacle lens 3' are in each case formed as a spherical surface, which surfaces are arranged concentrically, with the result that no correction of defective vision is brought about for the user. With respect to its optical imaging effect the spectacle lens 3' is neutral, as it is formed by the spherical curvature profile of front and rear sides 7', 8' as a concentric meniscus or zero meniscus and thus carries out imaging with a refractive power of zero. This optical imaging effect of the spectacle lens 3' can also be called a predetermined optical imaging function. Due to the described formation of the spectacle lens 3' it has a constant thickness. However, the constant thickness leads to the difficulty that vignetting can occur in the imaging, as the bundle diameter of the beams coming from the image-generating module 5 and required for the illumination of the exit pupil 14 is greater in the yz-plane in the area of the end face 9 than the corresponding dimension of the end face 9. The corresponding light beams 20, which come from the image-generating module 5, would therefore strike the rear side 8, as represented in FIG. 4. These beams 20 would thus strike the deflecting section 11 at an angle other than that drawn in and thus not arrive at the exit pupil 14 and therefore be vignetted. The beam profile represented in FIG. 4 was calculated starting from the exit pupil 14 as far as the image-generating module 5, wherein, as an approximation, the refractive effect in the transition between end face 9' or rear side 8' and surroundings was disregarded, in order to be able to clearly show the described vignetting.

The thickness in the edge area 10 is therefore chosen to be greater, with the result that no vignetting occurs and all the beams from the image-generating module 5 strike the deflecting section 11 via the end face 9 in the manner shown in FIG. 2. This naturally has the result that the predetermined optical imaging function (here no correction of defective vision, or an imaging effect with a refractive power of zero) is no longer present in the edge area 10, as the curvature profile in the edge area is now different from the originally predetermined curvature profile. However, in practice this is not disruptive, as the edge area 10 is not required in the case of normal use of the display device 1. In other words, when the display device 1 is fitted on, the user will not look through the edge area 10 of the spectacle lens 3.

The edge area 10 preferably only begins in the case of a direction of view greater than 20°, 30° or 40°. By a direction of view of x° is meant here in particular the angle α=x° of the visual axis in relation to the visual axis when looking straight ahead (FIG. 2).

Preferably, only the curvature of the rear side 8 in the edge area 10 is altered, with the result that it is scarcely visible from outside that there is a change in the thickness of the spectacle lens 3. The changed curvature profile 16 of the rear side 8 in the edge area 10 thus leads to an imaging effect with a refractive power different from zero.

In particular the changed curvature 16 of the rear side 8 in the edge area 10 can be chosen such that it serves to improve the imaging of the image generated by means of the image-generating module 5. The curvature profile 16 can be designed e.g. as a freeform surface which, although curved, is neither spherical nor rotationally symmetrical. It also preferably has no mirror symmetry.

Figure 3B:
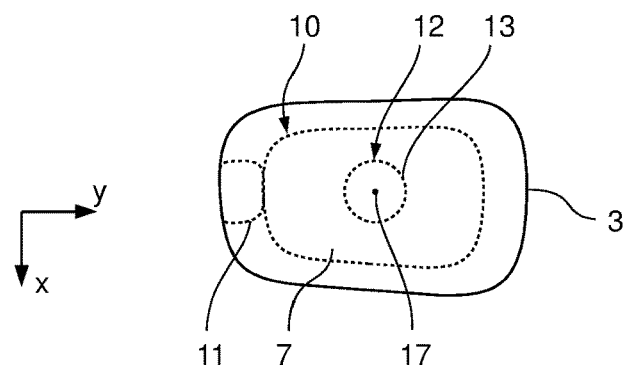
FIG. 3b is a top view from the front of the spectacle lens from FIG. 1 according to a modification according to the invention.

In the embodiment described here, the deflecting section 11 is formed in the entire edge area 10, wherein, when the spectacle lens is viewed from above, the edge area 10 extends only along a part of the circumference. Naturally the edge area 10 can have an extent in the circumferential direction which is larger than the corresponding extent of the deflecting section 11 in the circumferential direction. In particular the edge area 10 can be formed annular, as represented in FIG. 3b. The edge area 10 thus extends along the entire circumference of the spectacle lens 3. In contrast, the deflecting section 11 again extends only along a part of the circumference. If the edge area 10 is formed annular, the spectacle lens 3 can be produced more easily.

Figure 5:
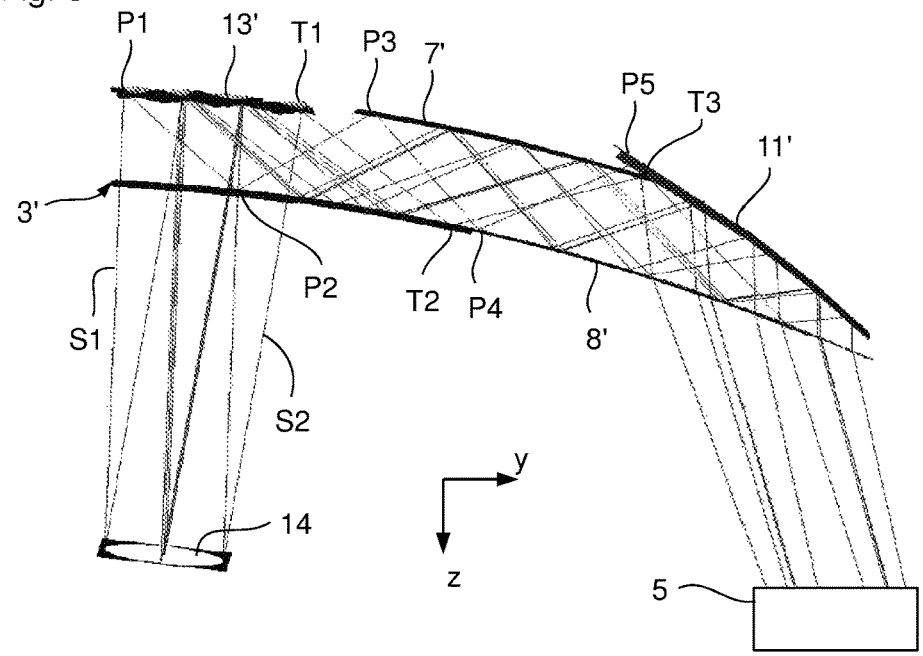
FIG. 5 is a sectional view according to FIG. 2 of a further conventional spectacle lens.

FIG. 5 shows, in a manner similar to FIG. 4, a sectional view of a conventional spectacle lens 3'. A beam S1 which, from the left-hand edge of the eyebox 14, strikes the coupling-out section 13' at the point P1 (the beam path from the eyebox 14 to the image-generating module is being considered; in operation the direction of propagation is, naturally, opposite) arrives via the total reflection points P2, P3 and P4 at the point P5 in the deflecting section 11'. The point P5 represents the necessary point of the deflecting section 11' located furthest to the left.

The beam S2, which again runs upwards from the right-hand edge of the eyebox 14 via the point T1 on the coupling-out section 13' and the total reflection point T2, would now have to be totally reflected again at the point T3. However, the point T3 already lies in the deflecting section 11', with the result that this beam would be vignetted. This also applies to all further beams which would still have to receive a total reflection to the right of the point P5. These do not all contribute to the imaging or are possible stray light sources.

Figure 6:
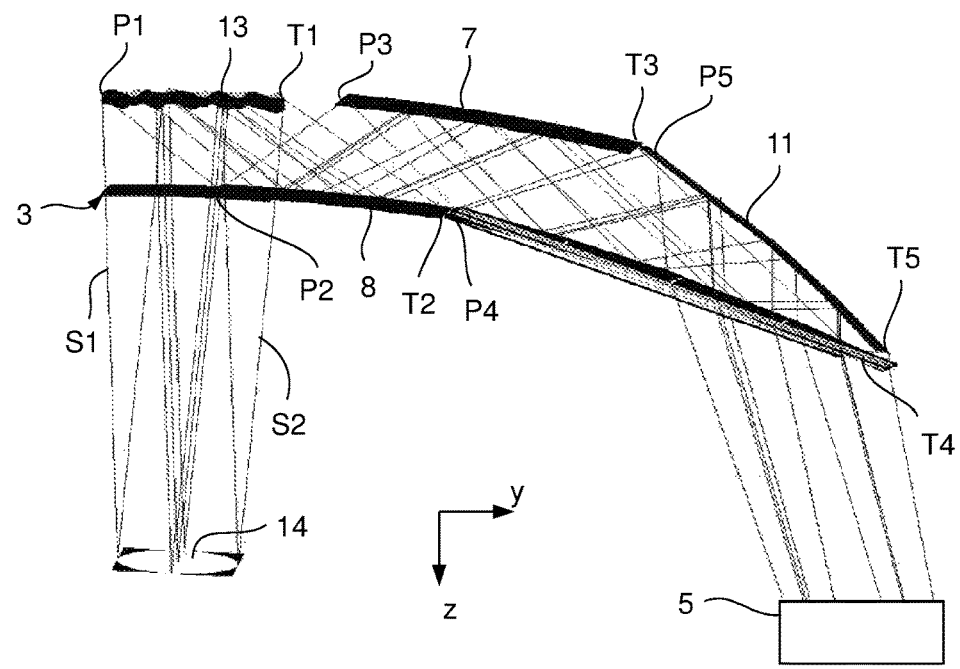
FIG. 6 is a sectional view according to FIG. 2 of a spectacle lens of a further embodiment of the display device according to the invention.

The thickness of the edge area 10 is therefore increased in such a way that the point T3 now lies to the left of the point P5 and thus there is no penetration of the spherical spectacle lens area of the front side 7 with the coupling-out section 11, as is shown in FIG. 6. There is thus also no longer any aperture trimming and all the beams from the image-generating module 5 can be imaged as far as the exit pupil 14. The beam S2 e.g. is totally reflected again at the point T4 and then strikes the deflecting section 11 at the point T5.

The display device 1 is in particular formed such that all the beams which are guided as far as the exit pupil 14 experience the same number of reflections when guided from the deflecting section 11 as far as the coupling-out section 13 on the front and rear sides 7, 8 of the spectacle lens 3.

In the described embodiments of the display device 1, the virtual image is coupled into the user's field of view via the right-hand spectacle lens 3. Of course, a coupling-in only via the left-hand spectacle lens 4 is also possible. In addition, the display device 1 can be formed such that information is reflected in via both spectacle lenses 3, 4. The reflection can take place such that a three-dimensional image impression forms.

In the described embodiment examples, the predetermined optical imaging effect of the spectacle lenses 3 and 4 is an imaging effect with a refractive power of zero. Naturally the spectacle lenses can also have a refractive power not equal to zero and in particular be designed to correct defective vision. In this case also, there is then a greater thickness in the edge area in comparison with the thickness that would result for the predetermined optical imaging function in the case of the curvature profile of front and rear sides 7, 8.

The spectacle lenses 3, 4 can be produced e.g. from a glass or also from plastic and can naturally also be used in the case of other display devices which can be fitted on the head of the user.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for an image-generating display device that can be fitted on the head of a user and generate an image, comprising:

a single lens element defining a curved front side and a curved rear side, and, when the single lens element is viewed from above, a coupling-in section in an edge area of the single lens element and a coupling-out section spaced apart therefrom, wherein a thickness dimension is defined as spanning between the curved front side and curved rear side, wherein the curved rear side has a curvature profile such that it corrects a vision defect of the user when looking through the single lens element, wherein the single lens element is configured to couple the generated image into the single lens element via the coupling-in section of the single lens element, and to guide the generated image in the single lens element by reflections at the front side and the rear side of the single lens element as far as the coupling-out section and to couple the generated image out of the single lens element via the coupling-out section to an exit pupil in which the user's eye is to be positioned for perceiving the coupled-out image, wherein the coupling-out section is located within a center area of the lens defined within an angle of 40 degrees of a center point of the single lens element as measured from the exit pupil, wherein, in order to reduce vignetting occurring when the generated image is guided via the coupling-in section through the single lens element as far as the coupling-out section, the thickness dimension in the edge area is larger in comparison to the thickness dimension elsewhere in the spectacle lens, and wherein the single lens element has a refractive power not equal to zero.

2. The spectacle lens according to claim 1, wherein the single lens element has the greater thickness in the edge area as compared to the coupling-out section.

3. The spectacle lens according to claim 1, wherein the edge area with the greater thickness, when the single lens element is viewed from above, extends annularly.

4. The spectacle lens according to claim 1, wherein the edge area with the greater thickness, when the single lens element is viewed from above, extends in the circumferential direction of the single lens element along only a part of the circumference and not along the entire circumference.

5. The spectacle lens according to claim 1, wherein at least one of the coupling-in and coupling-out sections has an imaging effect.

6. The spectacle lens according to claim 1, wherein the coupling-in section has a collimation effect.

7. The spectacle lens according to claim 1, wherein at least one of the coupling-in and coupling-out section provides a folding of the beam path.

8. The spectacle lens according to claim 1, wherein at least one of the curved front side and a curved rear side define a non-spherical surface.

9. The spectacle lens according to claim 1, wherein the edge area spans an arc of less than 40° from an end of the single lens element as measured from the exit pupil.

10. The spectacle lens according to claim 1, wherein the coupling-in section comprises an area of an end face of the single lens element connecting the front and rear sides.

11. The spectacle lens according to claim 10, wherein the area of the end face has an imaging effect.

12. The spectacle lens according to claim 1, wherein the coupling-in section is at least one of refractive and reflective.

13. A display device, comprising:
a holder that can be fitted on the head of a user;
an image-generating module which generates an image and is secured to the holder; and
an imaging optical system which is secured to the holder and which has a spectacle lens according to claim 1 and which, when the holder is fitted on the head of the user, images the generated image such that the user can perceive it as a virtual image.

14. The display device according to claim 13, wherein the imaging optical system has collimation optics which are arranged between the spectacle lens and the imaging system module.

15. The display device according to claim 13, wherein the imaging optical system has a refractive power not equal to zero.

16. The display device according to claim 14, wherein the imaging optical system has a refractive power not equal to zero.

17. The display device according to claim 13, wherein the spectacle lens is a single lens element.

18. The spectacle lens according to claim 1, wherein the edge area is designed such that an imaging error of the single lens element, which occurs when the generated image is guided from the coupling-in section to the coupling-out section through the single lens element, is corrected.

19. The spectacle lens according to claim 1, wherein the spectacle lens is said single lens element.

* * * * *